US006604603B1

(12) United States Patent
Wirth (10) Patent No.: US 6,604,603 B1
(45) Date of Patent: Aug. 12, 2003

(54) SOUNDPROOFING FOR INSULATING SOUND PRODUCING DEVICES OR PARTS OF SYSTEMS, ESPECIALLY DEVICES THAT TRANSMIT VIBRATIONS SUCH AS VIBRATORS

(75) Inventor: Anton Wirth, Gais (CH)

(73) Assignee: Etis AG, Teufen (CH)

( * ) Notice: Subject to any disclaimer, the term of this patent is extended or adjusted under 35 U.S.C. 154(b) by 0 days.

(21) Appl. No.: 09/868,135

(22) PCT Filed: Dec. 16, 1999

(86) PCT No.: PCT/CH99/00609
§ 371 (c)(1),
(2), (4) Date: Mar. 28, 2002

(87) PCT Pub. No.: WO00/36239
PCT Pub. Date: Jun. 22, 2000

(30) Foreign Application Priority Data

Dec. 17, 1998 (EP) ............................................. 98123954

(51) Int. Cl.⁷ ............................................... G10K 11/04
(52) U.S. Cl. ..................... 181/200; 181/284; 181/290; 181/291; 181/294
(58) Field of Search ................................ 181/200, 201, 181/202, 284, 290, 291, 294

(56) References Cited

U.S. PATENT DOCUMENTS

| 2,732,227 A | | 1/1956 | Kaiser | |
| 3,187,778 A | | 6/1965 | Peyton | |
| 3,881,569 A | * | 5/1975 | Evans, Jr. | 181/200 |
| 3,951,228 A | * | 4/1976 | Schnell | 181/200 |
| 3,963,094 A | | 6/1976 | Nowikas | |
| 5,009,043 A | * | 4/1991 | Kurrasch | 52/145 |
| 5,060,752 A | | 10/1991 | Heiberger | |

FOREIGN PATENT DOCUMENTS

| DE | 0 108 856 | 5/1984 |
| DE | 33 07 457 A1 | 9/1984 |
| DE | 36 36 341 A1 | 4/1988 |
| DE | 0 403 943 | 12/1990 |
| DE | 0 676 580 A2 | 10/1995 |
| EP | 0 108 856 A1 | 5/1984 |
| EP | 0 403 943 B1 | 12/1990 |
| EP | 0 676 580 B1 | 10/1995 |
| GB | 1 471 889 | 4/1977 |
| WO | 97/48943 | 12/1997 |

* cited by examiner

Primary Examiner—Shih-Yung Hsieh
(74) Attorney, Agent, or Firm—Harness, Dickey & Pierce, P.L.C.

(57) ABSTRACT

A soundproofing system is used to insulate sound producing devices or parts of systems, especially vibrating conveyers. Such a system includes insulating elements that are provided with an inner face in the direction of the sound source and an outer face in the direction away from the sound source. A sound absorbing membrane which is made of a textile material and, more particularly, at least partially consists of glass fiber threads and/or woven wire, is arranged in the region of the inner face. The sound absorbing membrane is the inner skin of a covering. The covering includes an outer skin made of textile material. A soft insulating material comprising fiber mat material is arranged together with solid flat material in between the inner and outer skin of the covering. The insulating element offers optimal usage of all three elements, i.e., damping diaphragm, insulating material and at least one reflecting surface on the solid flat material.

25 Claims, 5 Drawing Sheets

SOUNDPROOFING FOR INSULATING SOUND PRODUCING DEVICES OR PARTS OF SYSTEMS, ESPECIALLY DEVICES THAT TRANSMIT VIBRATIONS SUCH AS VIBRATORS

This application is the national phase under 35 U.S.C. §371 of PCT International Application No. PCT/CH99/00609 which has an International filing date of Dec. 16, 1999, which designated the United States of America.

FIELD OF THE INVENTION

This invention relates to soundproofing for insulating sound generating devices or parts of systems particularly vibrating conveyers with insulation elements that are bordered by an inner face in the direction of the sound source and by an outer face in the direction away from the sound source; and the insulation elements comprising layers of insulation material with a hollow cavity component. Such insulation is used for acoustic insulation and optionally also thermal insulation of equipment, installation parts, motors or machines, in particular for vibration conveyers. This invention preferably includes soundproofing that can be removed quickly by hand and reinstalled again in the event of inspections, repairs, problems, etc.

BACKGROUND OF THE INVENTION

The known insulation systems have various disadvantages. The most common type of insulation is so-called cassette insulation, such as that described as thermal insulation in German Patent 36 36 341. However, cassettes of similar design are also widely used for soundproofing. A cassette is understood to be a housing made of steel plate or chrome steel plate with an open inside. To achieve a sound absorbing effect, insulation mats are inserted into the cassette from the inside. The surface of the insulation mats facing inward may be flat or may optionally have a three-dimensional structure. The air movements of the sound waves are hindered or attenuated in the insulation mat. If it is assumed that sound is reflected on the sheet metal wall of the cassette housing, the maximum air movements are at a distance of one-quarter wavelength from this reflective surface. To be able to optimally dampen these air movements, the thickness of the insulation mat would have to be in the range of one-quarter wavelength. With a justifiable layer thickness, this is possible only at a high frequency, because wavelengths in the low frequency range down to approx. 500 Hz are more than 60 cm, so the quarter wavelength would be more than 15 cm accordingly. At 2 kHz, the quarter wavelength is approx. 4 cm, which is thus within the range of the insulation material layer thicknesses conventionally used. Accordingly, the known soundproofing is effective only in the high frequency range with a frequency of more than 1 kHz.

If devices are enclosed in such cassettes, metallic housing side edges extend from the inside of the insulation to the outside in the contact area between adjacent cassettes or between a ring of cassettes and a cover element adjacent to this ring. Such housing side edges form sound bridges which greatly promote unwanted transmission of sound toward the outside. Accordingly, such a soundproofing system does not provide an adequate noise reduction effect even in the high frequency range.

The absorption coefficients of various materials and wall structures depend on the frequency. Essentially, fiber material has a high absorption coefficient in the range of 1 kHz. For example, measurements on a concrete wall coated with a fiber material have yielded absorption coefficients of 0.14, 0.20, 0.79 and 0.37 at frequencies of 125 Hz, 250 Hz, 1 kHz and 4 kHz. A plywood board has an elevated absorption coefficient in the low frequency range. Absorption coefficients of 0.60, 0.30, 0.09 and 0.09 have been determined for frequencies of 125 Hz, 250 Hz, 1 kHz and 4 kHz by performing measurements on a plywood board. The greater absorption in the low frequency range can be explained by resonance and the energy absorbing internal friction of the plywood board. The low absorption in the high frequency range shows that high frequency vibrations have little effect on friction because of the small amplitudes.

In addition to cassettes that are open toward the inside, cassettes which include a perforated plate as the inner face, so that a sheet metal face is adjacent to the soft insulation layer on both the inside and outside, are also used. In this way, absorption in the low frequency range should be combined with absorption provided by fiber mats in the high frequency range. Sound absorbing resonators are formed and kept open between the two metal plates due to the holes in the perforated plate arranged on the inside. The resonators and the insulation layer guarantee sound absorption in the respective frequency ranges according to the respective dimensions of the resonators and the absorption property of the insulation material. The cohesive area of the perforated plate arranged on the inside forms a reflective surface at least for the high frequency range. The sound component reflected on this reflective surface can excite resonance that is radiated outward over sound bridges, depending on the shape of the interior space adjacent to the insulation, for various frequency ranges.

The known soundproofing system for sheathing equipment usually guarantees a relevant sound absorbing effect only in certain portions of the high frequency range. However, since many types of equipment generate sound with frequency components in frequency ranges that are far apart, at least individual frequency components are not absorbed enough. In the case of equipment with very high sound levels, the ambient air quality standards or guideline values cannot be met with the known insulation, in particular when various types of such equipment are set up in one working area.

International Patent application WO 97/48943, a patent application by the present applicant, describes insulation which is in direct contact with the three-dimensional outside surface of structural components. It includes a contact layer or a friction layer made of sheet metal and/or wire mesh which is in contact with the structural component. To achieve stability of the insulation elements and to be able to absorb axial forces between adjacent insulation elements, solid supporting half-rings arranged on the end faces of the insulation elements are in contact with the structural component and extend over the entire thickness of the insulation element. These supporting half-rings or solid ribs form unwanted sound bridges which extend essentially over the entire thickness of the insulation elements and thus transmit sound from the interior of the insulation to the environment. Another disadvantage of the insulation according to International Patent WO 97/48943 is that it can only be mounted directly on the structural component, not at a desired distance from it. In addition, this insulation is designed mainly as thermal insulation and does not have the desired damping properties over the entire frequency range.

Vibrating conveyers or so-called vibrators that transmit vibrations have the object of supplying components that are used in an automatic assembly operation, such that they are supplied serially and in particular in the proper cycle. To do so, these vibrators are in the form of a vessel with a curved bottom and a conical side wall. At least one spiral-shaped ramp is provided on the conicalside wall. Vibration of the vessel is induced by magnet-metal spring packages which are arranged between the vessel and a solid base. Because of this vibration, the loose parts accommodated in the vessel are moved toward the wall of the vessel and on the ramp toward the output end of the ramp. The noise emitted by the vibrators has two different sources. First, a low frequency hum, the so-called transformer hum, is emitted by the magnet-metal spring packages. The sound level of this low frequency component is very high. For example, a sound pressure level of 90 dB(A) has been measured at 16 Hz. On the other hand, the moving loose parts produce noise in the high frequency range. This noise is formed by relative movement between the loose parts and the vibrating vessel or ramp and by collisions between abutting parts of the loose parts. There are also parts with a natural resonance that can be excited by the vibration. Other noise sources include blast nozzles or deflection devices which are optionally present and guarantee for example a desired conveyance of the isolated loose parts.

Depending on the loose parts fed in the individual case, noise levels of more than 100 dB may occur with vibrators; this is hazardous for the health of the operating personnel and also reduces productivity. Known vibrator sound reduction measures include, for example, two insulation cassettes in the form of half rings with a sheet metal housing that is open toward the inside and a 30 mm thick nubby foam layer of polyurethane. These two cassettes are joined in the form of a ring around the vibrator. They must not be in contact with the vibrator, because otherwise the vibrator movements would be disturbed. A 5 mm thick plexiglass cover is placed on the flange or the upper end edge of the housing. The supply and separation of parts in the vibrator can be monitored visually by operating personnel through the plexiglass cover. The separated loose parts then pass out of the interior of the insulation to a processing station through an outlet opening. It has now been found that a maximum total sound reduction of only 10 dB(A) can be achieved with such a soundproofing system. Therefore, in the case of a vibrator with a high sound level, the sound level of the insulated vibrator is even above the maximum continuous sound pressure level of 85 dB(A) which can be tolerated for industrial activities. The sound reduction effect in the low frequency range or damping of transformer hum in particular is very weak. The large sound component in the environment is transmitted outward as airborne noise and as structure-borne noise.

SUMMARY OF THE INVENTION

The object of the present invention is to provide an insulation which greatly reduces both airborne noise and structure-borne noise transmission. On the whole, a significantly greater reduction in the total sound level is to be achieved in comparison with the known soundproofing systems. In particular, a reduction in the total audible frequency range is to be achieved, i.e., in both the low frequency range and the high frequency range, so that this soundproofing system can be used in a variety of ways.

This object is achieved through the features of claim 1. The dependent claims describe alternative and advantageous embodiments.

In achieving this object, it has been found that all possible sound suppression measures must be as completely effective as possible, independent of one another. A broadband absorption spectrum is achieved with a textile sound absorbing membrane which is preferably made at least partially of synthetic threads, in particular glass fiber threads and/or wire. The textile sound absorbing membrane is preferably designed as a woven fabric, but optionally as a braided or knit fabric, a wire mesh or wire screen. Thus, this is a textile surface or a textile material. However, multidirectional wire layers or optionally thread layers that are bonded together but not woven may also be used as the sound absorbing membrane. The sound absorbing membrane preferably has a high density and is optionally coated. This increases the inertia of the sound absorbing membrane, so that it makes the desired inelastic soundproofing feasible in the low frequency range. It is self-evident that the inertia of the sound absorbing membrane can be optimized according to the respective application or the effective frequency spectrum by adapting the cross section, density and material of the thread and/or the wire, but a standard design of the sound absorbing membrane is usually sufficient. A sound absorbing membrane designed like a woven fabric makes it possible to achieve a mechanical friction between sections of thread or wire that are in contact with one another in addition to internal friction within the threads or wires. This friction guarantees a high sound absorbing capacity of the resonant sound absorbing membrane.

Because of its textile structure, the sound absorbing membrane does not have any large partial areas with a smooth surface to function as a reflective surface. The textile structure like that of a woven fabric preferably has a high density of through-holes, so that this structure is permeable for the high frequency range. The high frequency range is absorbed strongly in the soft insulation material after passing through the sound absorbing membrane. The insulation material consists of a long-fiber layer material, preferably silicate fiber mats, and it has cohesive air channel systems for absorption of high frequency sound. In the passage of the high frequency sound component through the membrane, in particular resonating with a low frequency component, a diffraction occurs at the through-holes through the fabric membrane, increasing the sound absorbing effect. The high density of extremely small through-holes permits movement of air relative to the skin, which has a strong friction effect. This prevents a purely elastic resonance of the sound absorbing membrane. These through-holes through the membrane are not to be understood as inlet openings of discrete resonators as is the case with perforated plates. Therefore, the absorption is also not limited to a narrow frequency range.

A wire cloth in particular can be used as the sound absorbing membrane, preferably using chromium wire or a high-grade steel wire for use at high temperatures or in the possible presence of moisture. If a sound absorbing membrane is not exposed to high temperatures, it may optionally be made of synthetic fibers, but preferably glass fibers or ceramic fibers, optionally with wires braided into them. The density (mass per unit of area), the air permeability, the oscillational, frictional and soundproofing properties are optimized so that the desired noise reduction effect is achieved. A wire mesh that was used has 130 mesh/cm$^2$ and an open area in the range of 40–55%, e.g., approx. 51%. The weight of this wire cloth is approx. 0.910 kg/m$^2$ with a wire diameter of approx. 0.25 mm. Since the effect of this coarse wire mesh is very weak, microfilter metal cloth has also been used.

Microfilter metal cloth has a very high mesh count per area plus optionally special weave structures and is formed from wire having a small cross section. Accordingly, a filter fineness of a few microns—e.g., 20 ηm—and a small air passage cross section or air permeability value can be achieved. The wires of the flat microfilter material preferably have diameters in the range of 0.02 mm to 0.4 mm, in particular 0.04 mm to 0.13 mm and the mesh count in one direction is in the range of 80 to 1000 per cm. A conventional commercial microfilter metal cloth with a warp wire diameter of 0.042 mm and a weft wire diameter of 0.125 mm has a mesh count of 600×125 per cm$^2$. This filter cloth has a weight of approx. 0.850 kg/m$^2$, which essentially corresponds to the weight of the wire cloth mentioned above. In addition to the difference in air permeability, another difference between these two types of wire cloth given as examples is their mobility. The cloth made of thicker wires has a much greater resistance to bending, which has a negative effect on the resonance in the short wavelength or high frequency sound range. Since the microfilter metal cloth has a much greater wire diameter in the weft direction than in the warp direction, it has a much greater resistance to bending in the weft direction than in the warp direction. When using warp and weft wires of different thicknesses, an optimal resistance to bending which has a sound absorbing effect can be achieved with microfilter metal cloth in at least one direction.

However, if the development of turbulence at the through-holes and/or the weight per unit of area and/or the friction in the vibrating membrane is to be increased in order to achieve an optimized absorption of sound in the low frequency range, then only the inner face or outer face or optionally another membrane, in particular an interlayer between the inner and outer faces may be provided with a different air permeability and/or a greater weight per unit of area and/or a greater frictional effect or uptake of energy of deformation.

The combination of the sound absorbing membrane with the soft insulation material also has the advantage that the low frequency movement of the sound absorbing membrane is retarded not only by internal friction and by the mechanical friction in the fabric but also by the deformation of the insulation material which has a frictional effect because of the sound absorbing membrane moving against it. The insulation material then assumes the function of at least partially inelastic resiliency of the sound absorbing membrane when compressed. These frictional and sound absorbing effects permit a broadband inelastic sound absorbing effect with the help of the sound absorbing membrane in the area of the inner face of an insulation element.

The stable flat material provides at least an essentially smooth reflective surface which reduces the escape of sound on the one hand while influencing the inner sound field on the other hand so that the node faces of the reflected sound develop on this reflective surface. This also increases the sound absorbing effect of the insulation material adjacent to the reflective surface in the direction of the inner face, because this insulation material is thus not in the area of node faces. The stable flat material is optionally produced from metal in one layer, in particular with the metal layer having a thickness of at least 1.5 mm, but optionally from at least two layers of metal and rubber or a rubbery material, in particular with a rubber layer facing the inner face.

It is self-evident that the stable flat material can be brought to the desired shape by bending or pressing, but optionally also by casting or extruding, in which case plastics and rubber may optionally also be used in addition to metallic materials. The stable flat material guarantees dimensional stability to the insulation elements which is not based on supporting rings but instead is based on a stable or fixedly shaped cylindrical surface. This makes it possible to prevent sound bridges, and at least one reflective surface, which is important for the sound absorbing effect, is provided. Insulation elements with a layer of stable flat material may be designed to be free-standing or mounted on the structural component. In the case of mounting on the structural component, the shape of the stable flat material must be adapted to the shape of the structural component. To do so, the layers of the insulation elements must be produced from blanks that guarantee contact of the insulation elements with the structural component. The use of such blanks is known from International Patent WO 97/48943. The content of International Patent WO 97/48943 is also to be included in the disclosure content of the present invention, and is hereby incorporated herein by reference in its entirety and for all purposes.

The insulation element according to this invention guarantees the optimal effect of the three elements at the same time, namely the sound absorbing membrane, the insulation material and at least one reflective surface. However, not only is the overall effect to be understood as obtained by superimposing the individual effects, but instead an effect which goes beyond the sum of the individual effects can be achieved through the proposed arrangement of the three elements and the design of the sound absorbing membrane described here.

To be able to join the insulation elements together easily and in a soundproof manner, they include at least two covering skins, preferably made of fiberglass fabric. An inner skin of the covering facing the sound source thus forms a sound absorbing membrane. Optionally, however, an additional sound absorbing membrane, preferably a wire cloth, is arranged on the inner skin of the covering facing the sound source. A covering outer skin is provided in the area of the outer face. The two covering skins are joined together to form a closed covering. First, velcro strips and tabs with matching second velcro strips are attached to the covering outer skins, so that adjacent insulation elements can be secured to one another tightly by means of these velcro-type fasteners. To prevent outlet gaps or openings from developing, the velcro fasteners preferably extend along the entire contact areas between the insulation elements to be joined. Velcro fasteners are optionally also provided on the contact areas that come in contact on the lateral end faces.

In the case of vibrators or other devices, it is expedient to mount the vibrator or other device on a foam layer at the bottom. At least two insulation elements which also rest on the foam layer should be joined together in a ring around the vibrator or the device to form a closed jacket. On the upper end face, this jacket is connected to at least one other ring-shaped or partially ring-shaped closure insulation element. By connecting the coverings with velcro fasteners, tight but not rigid connections without sound bridges are formed. To nevertheless be able to monitor the vibrator visually despite the soundproofing, an inspection port is preferably provided together with a cover in these closure insulation elements. The cover includes two transparent plates arranged with a space between them.

BRIEF DESCRIPTION OF THE DRAWINGS

The drawings illustrate the soundproofing according to this invention on the basis of embodiments, showing:

FIG. 5: a section through an insulation element of the soundproofing system according to FIG. 4, where the stable flat material is a perforated plate arranged in the area of the inner face, FIG. 6: a section through an insulation element, where the stable flat material is arranged as a plate in the area of the outer face and a covering interlayer is arranged between two layers of insulation material, FIG. 7: a section through an insulation element with stable flat material in the area of the outer face, a layer of insulation material and a covering whose inner skin forms the sound absorbing membrane.

DETAILED DESCRIPTION OF THE PREFERRED EMBODIMENTS

Figure 1:
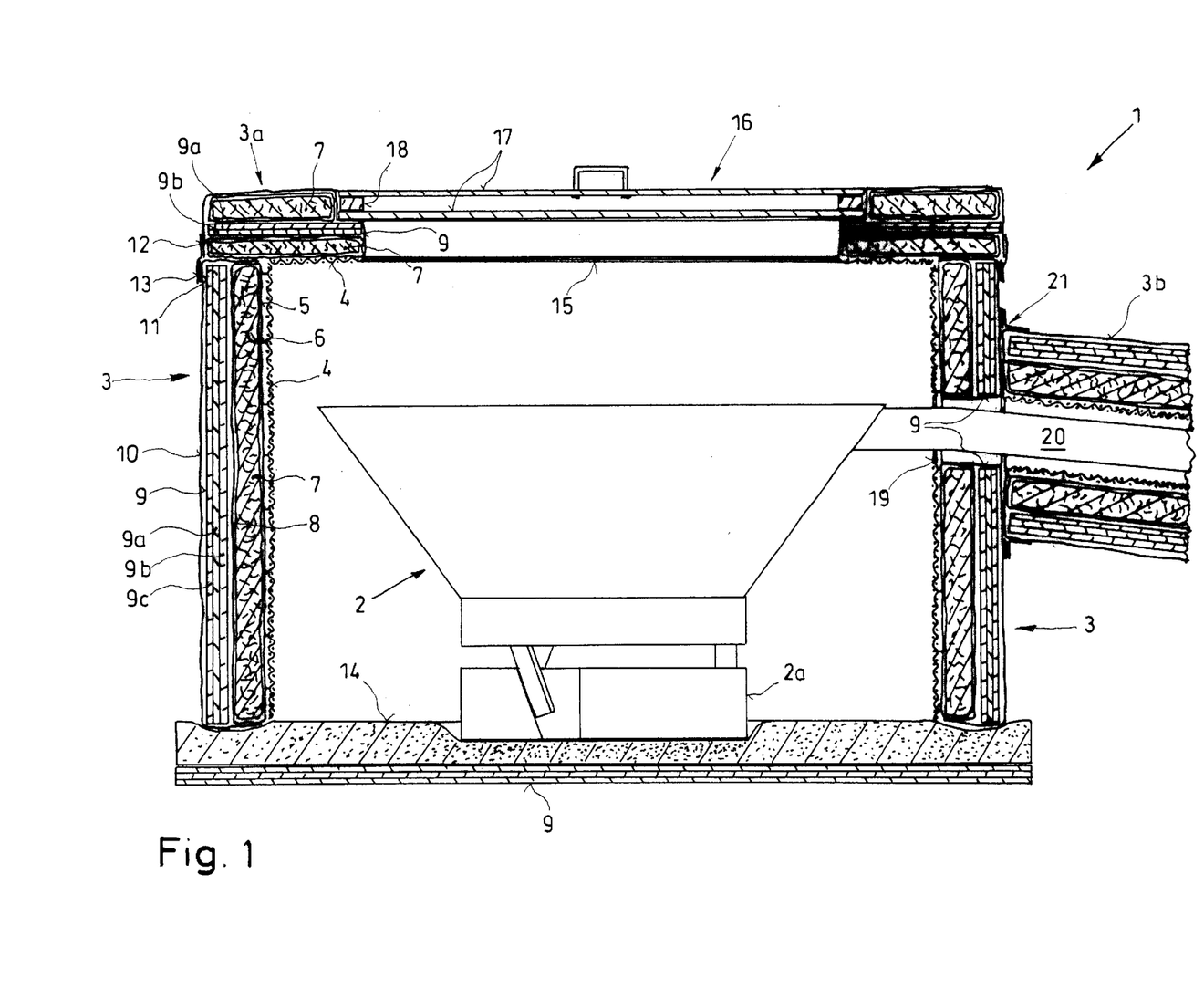
FIG. 1: a vertical section through a soundproofing system arranged around a vibrator.

FIG. 1 shows a soundproofing system 1 for a vibrator 2. The soundproofing system 1 includes insulation elements 3 with a sound absorbing membrane 4 which forms the inner face. The sound absorbing membrane 4 is preferably attached to an inner skin 5 of a covering. Thread or wire connections 6 are optionally provided, in particular along the lateral edges, between sound absorbing membrane 4 and the inner skin 5 of the covering. The embodiment illustrated here has a V4A wire cloth as sound absorbing membrane 4. It is self-evident that textile fabrics of synthetic threads, optionally with wires incorporated into them, may be used if the sound absorbing membrane 4 produced with such a fabric has a similar density (mass per unit of area), vibrational properties, frictional properties and sound absorbing properties. For example, a wire cloth that is used has 130 mesh/cm$^2$ and an open area in the range of 40–55%, in particular approx. 51%. The weight of this wire cloth is approx. 0.910 kg/m$^2$ with a wire diameter of approx. 0.25 mm.

Insulation material 7, preferably in the form of long-fiber layer material, in particular in the form of silicate fiber mats, is provided on that side of the covering inner skin 5 which faces away from the sound absorbing membrane 4. In the embodiment illustrated here, a covering interlayer 8 is provided on the insulation material 7. The covering inner skin 5 and the covering interlayer 8 are located adjacent to the insulation material 7 in the example illustrated here. The covering inner skin 5 and the covering interlayer 8 form a closed envelope or covering around the insulation material 7. A stable flat material 9 is arranged on the side of the insulation material 7 facing away from the sound absorbing membrane 4. The stable flat material 9 is illustrated in the figure with an exaggerated thickness in comparison with insulation material 7 to permit illustration of an embodiment with a flat material composed of three layers.

The stable flat material 9 comprises at least a first reflective surface with an essentially smooth surface and consists preferably of at least one metal layer 9a. This metal layer 9a is at least 1.5 mm thick and is preferably made of iron, which due to its high density of approx. 7.9×10$^3$ kg/m$^3$ has a sufficiently great inertia or a great weight per unit of area even with thin layers, as is needed for good sound reflection. In the case of lighter metals such as aluminum with a density of approx. 2.7×10$^3$ kg/m$^3$, the layer thickness must be increased by a factor of 3 to achieve an equally great mass per unit of area. To provide a second reflective surface, a first rubber layer 9b made of rubber or a rubbery material is optionally arranged on the side of the stable flat material 9 facing the insulation material 7. The sound striking the stable flat material 9 from the direction of the inner face is reflected at least at the first reflective surface, but optionally also partially on the second reflective surface. Since a rubber layer also absorbs sound, the sound intensity is reduced twice in the rubber layer, namely on the path to the first reflective surface and on the path of the reflected sound back toward the inner face of insulation element 3. Because of the sound absorbing property of the rubbery material, it may optionally also be expedient to provide a second rubber layer 9c on the outside of the stable flat material 9 so that the sound component passing through the metal layer 9a can be radiated back only after being damped.

To permit a simple method of joining the stable flat material 9 to the insulation material 7 and the sound absorbing membrane 4, preferably a covering outer skin 10 is connected to the covering inner skin 5 or to the covering interlayer 8 or to the closed covering arranged around the insulation material 7. To prevent liquid from penetrating from the outside into the interior of an insulation element 3, the covering outer skin is preferably coated with silicone. This coating leads to a closed outer face and thereby increases the insulation property of insulation element 3. The covering inner skin 5 is preferably permeable to air and also has a sound absorbing effect similar to that of sound absorbing membrane 4, but preferably the weight per unit of area is somewhat lower, the through-holes through the fabric are somewhat smaller and they are present in a somewhat greater number per unit of area. Therefore, the absorption spectrum of this covering inner skin 5 is shifted slightly toward higher frequencies in comparison with that of the sound absorbing membrane 4.

The covering skins are designed as flat textile materials, preferably woven, but optionally also braided or knit. Since they assume mainly the function of cohesion, they may optionally also be designed as a mesh. To produce the covering skins, a variety of threads consisting of natural or synthetic materials may be used, such as glass fibers, synthetic fibers, Kevlar fibers, carbon fibers and even wires, in particular high grade steel wires. These threads and optionally also the wires may be coated. In the case of wires, V4A wires with diameters in the range of 0.062 mm, for example, are expedient. The choice of a thread or a wire will depend on the temperature and friction stress to be expected as well as the method of processing to yield the textile material. For the covering inner skin 5 and optionally also for the covering interlayer 8, woven fabrics of glass fibers with metal wires interwoven in them are used in particular.

In order to use only a minimum number of covering skins, the covering outer skin 10 is optionally connected directly to the sound absorbing membrane 4, so that these two skins together form a closed covering around the insulation material 7 and the stable flat material 9. It has been found that the desired soundproofing effect is achieved with a total thickness of the insulation element 3 in the range of approx. 4 cm. This thickness is attributed essentially to the insulation material. The thickness of the sound absorbing membrane 4 and the covering skins 5, 8, 10 is in the range of only approx. 1 mm. The thickness of the stable flat material 9 is in the range of 1.5 to 10 mm.

In addition to the reflection function, the stable flat material 9 also has a shaping function. By designing the stable flat material 9 for example in the form of a cylindrical sheathing part, an insulation element 3 with the same shape can be provided. It is self-evident that insulation elements 3 can thus be provided in a wide variety of shapes. Instead of using a cylindrical insulating jacket, it may optionally be expedient to connect several planar insulation elements 3 to form a closed jacket to achieve a different reflection behavior in the interior of the insulation. If sound is reflected several times in the interior of the insulation, it may be assumed that the sound waves also strike an insulation element 3 obliquely and thus different effective wavelengths are in effect for the sound absorbing membrane 4 and the insulation material 7 and apparently increased layer thicknesses are in effect for the sound wave. This means that the sound absorbing property of the insulation can be further increased by an expedient three-dimensional design of the insulation.

To be able to join insulation elements 3 by means of velcro fastenings, first velcro strips 11 and/or tabs 12 are attached to the covering outer skins 10 with matching second velcro strips 13. The velcro fasteners extend preferably along the entire contact area between the insulation elements 3 that are to be joined. Tabs 12 are preferably made of a fiberglass cloth and in particular are coated with silicone. Sound outlet gaps can be prevented with these fasteners 15 without using flanges which form sound bridges.

Since the layers of the insulation elements 3, namely the sound absorbing membrane 4, the covering inner skin 5, the insulation material 7, the stable flat material 9 and the covering outer skin 10 are made of parts of material sheeting, an insulation element with any desired shape or inner face can be provided through the proper choice of blanks and the combination of these blanks. Shaping of the stable flat material may also be accomplished by bending or pressing methods, optionally even by casting methods. If needed, the insulation elements according to this invention may thus be adapted essentially exactly to a structural component. Experiments have shown that this soundproofing may also be used with the sound absorbing membrane adjacent to the structural component. Therefore, the insulation according to this invention is also especially advantageous in insulating pipes and other noise producing installation parts. Then the insulation is not installed from the bottom up, but instead is mounted directly on the structural component in the form of sheathing. Then insulation elements 3 in the form of a half shell, for example, are arranged around the pipes and are fastened by means of their velcro fasteners.

To prevent structure-borne noise from the base 2a of the vibrator 2 from entering the bearing surface or the floor beneath the vibrator, base 2a is preferably mounted on an elastically deformable foam layer 14. Pores on the top side of this foam layer 14 are preferably open, so that these pores can also absorb sound efficiently. Since the bearing surface of the vibrator 2 is usually a good barrier to prevent the escape of airborne noise, insulation on the floor or beneath the vibrator 2 can be designed optimally to absorb the structure-borne noise. It is obvious that in addition to or optionally instead of the insulating mounting of the base 2a, insulation with at least one insulation element according to this invention may also be provided in the area of the floor. To also provide an efficient reflective surface even in the area of the floor, a sheet, optionally in the form of a stable layer material 9, may also be arranged beneath the foam layer 14.

The minimum of two insulation elements 3 are combined with their lower end faces standing on the foam layer 14 to form a closed jacket. This jacket is connected to at least one other ring-shaped or partially ring-shaped insulation element 3a on the upper end face, in which case an inspection port 15 provided in it can be closed with a cover 16. This cover 16 preferably includes two, optionally more than two transparent sheets 17 arranged with a distance between them, with an elastic foam ring 18 arranged between them along the outer face. To provide a bearing edge and an insertion opening for the cover 16, another insulation material layer 7 arranged above the stable flat material 9 of the partially ring-shaped insulation element 3a is adapted to the outer face of the cover 16. The stable flat material 9 beneath it extends beneath the edge of the cover. In the example shown here, this stable flat material 9 has only two layers, a metal layer 9a and a layer of rubbery material 9b. It is obvious that the cover 16 could also rest on the insulation element 3a with the edge of a somewhat larger upper sheet 17, and then this insulation element 3a would not need a stepped border for opening 15.

If, as is the case with insulation element 3a, a layer of insulation material 7 is also arranged on the outside of the stable flat material 9, then the sound component passing through the stable flat material is damped again before escaping from the insulation element 3a, which is occasionally expedient. The sound absorbing membrane 4 of the insulation element 3a preferably extends only up to the sound absorbing membranes 4 of insulation element 3 which is adjacent to and beneath it. Optionally, however, it may also extend over the contact area of insulation elements 3 and 3a as far as the border of insulation element 3a.

Since the inspection port 15 is used for adding more loose parts as well as for visual monitoring, two openings could be provided, with each allowing only one of these functions. The feed opening would preferably be closed with an insulation element according to this invention, thus guaranteeing a significant reduction in sound propagation in comparison with the embodiment with the transparent cover 16 shown here. The inspection port could be designed to be much smaller and preferably equipped with a permanently inserted lens, so that good observation of the interior of the insulation would be guaranteed by the human eye or with an optical detection device.

In the case of vibrators 2, the loose parts must be able to reach a further processing station by passing through an outlet opening 19 in the jacket area of the insulation. To be able to easily mount and remove insulation elements 3 in the jacket area of the insulation, outlet opening 19 is preferably arranged in the contact area of two insulation elements 3 that can be interconnected. Along the outlet path, the loose parts are guided in at least one conveyance channel 20. To reduce the escape of sound through outlet opening 19 as much as possible, the insulation is continued around the conveyance channel 20 along its axis. Then a tubular insulation element 3b or optionally at least two partially tubular insulation elements 3a are attached by means of velcro fasteners 21 so they are in contact with the outer face of the insulation jacket wall around the outlet opening 19. To prevent the insulation elements 3b which are arranged around the conveyance channel 19 from coming in contact with it, insulation elements 3b are optionally supported in the area of the free end. Due to this continued tubular insulation, the area that is open from the interior of the insulation is very small. The shape of conveyance channel 19 and insulation elements 3b is optionally selected so that no sound can escape to the outside without being reflection and associated damping by insulation elements 3b.

The optimum insulation length of insulation elements 3b arranged around the conveyance channel also depends in particular on the dominant sound component to be absorbed, i.e., its frequency or wavelength. The frequency component in the range of 100 Hz is predominant in the low frequency sound component of the vibrator, which is supplied with electric power at a line frequency of 50 Hz. The dominant wavelength accordingly is thus in the range of 3 m. If it is assumed that a nodal area of this vibration is in the plane of the flat material 9 around the outlet opening 19, it would be especially advantageous to provide an insulation length of half a wavelength, i.e., essentially 1.5 m. Then a nodal area with a diminishing amplitude would be located at the outlet end of the insulation. If the outlet insulation also has a greater cross section in the area of a quarter wavelength, i.e., in its middle range, then this yields a $\lambda/4$ seal. Similar $\lambda/4$ seals are used to limit the radiation of electromagnetic waves from microwave ovens. However, since a length of 1.5 m is usually too long for outlet insulation, the length is preferably set at one eighth of the wavelength, i.e., essentially approx. 38 cm. It has been found that this makes it possible to achieve a sound outlet absorption comparable to that of a $\lambda/4$ seal.

In the embodiment according to this invention, metal flanges or sound bridges in the connection area between adjacent insulation elements can be omitted. Experiments have shown that a sound pressure level of approx. 102 dB may occur with a vibrator filled with loose parts. With the state-of-the-art insulation, the sound pressure level is still greater than 85 dB. However, insulation according to this invention could reduce the sound pressure level to 66 dB.

Figure 2A:
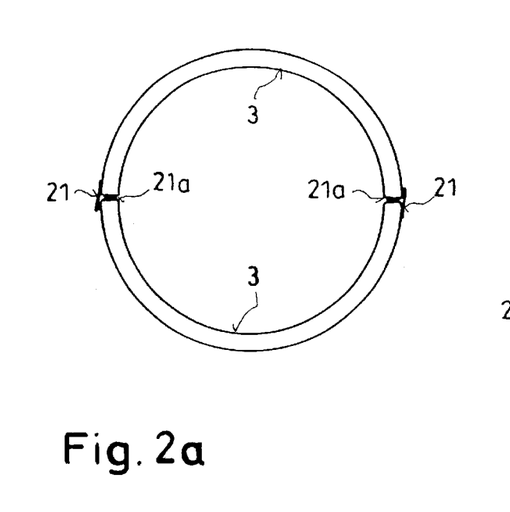
FIG. 2a: a top view of an insulation jacket with two semicylindrical insulation elements.

FIG. 2a shows an insulation jacket composed of two semicylindrical insulation elements 3. The insulation elements 3 are joined together by velcro fasteners 21 on the outer surface of the jacket and optionally also by velcro fasteners 21a on the contacting end faces. The insulation elements 3 may thus be arranged at a distance from the apparatus to be insulated according to FIG. 1. FIG. 2a is also used to illustrate insulation that is mounted in direct contact with the structural component. The insulation illustrated here thus fits a pipe whose outside diameter corresponds to the inside diameter of the insulation.

Figure 2B:
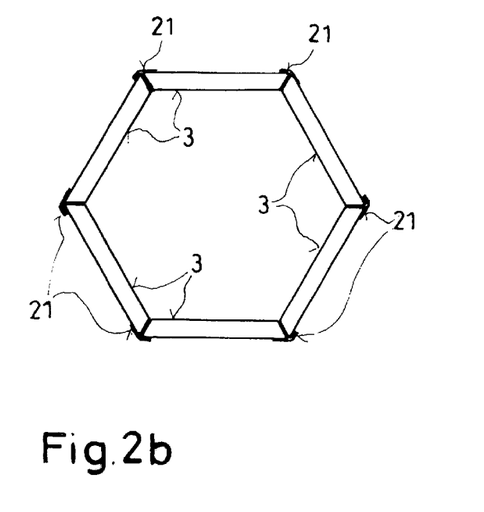
FIG. 2b: a top view of an insulation jacket with six planar insulation elements.

FIG. 2b shows a closed jacket composed of six planar insulation elements 3. Again, velcro fasteners 21 are provided for connecting them.

Figure 3A:
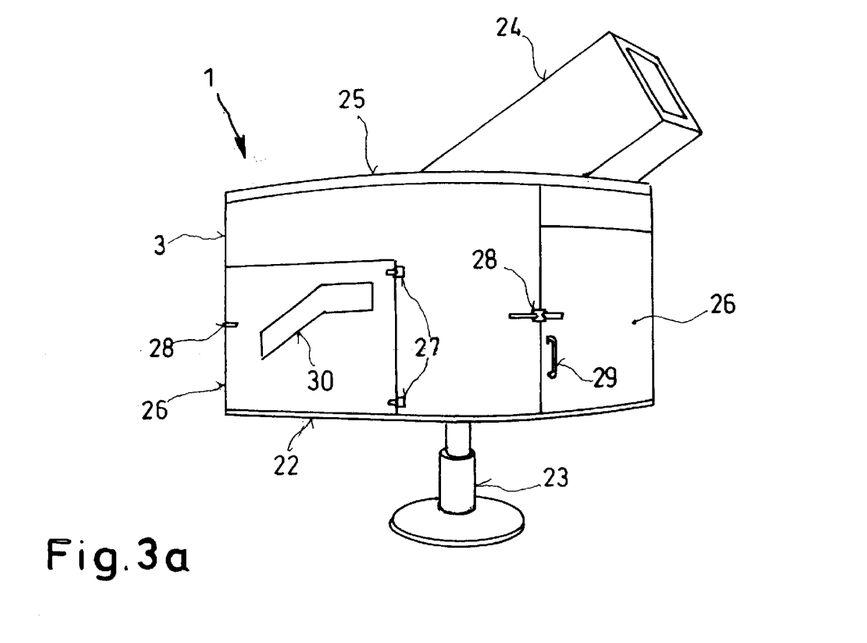
FIG. 3a: a perspective diagram of vibrator insulation on a plate with an adjustable height.

FIG. 3a shows a soundproofing system for a vibrator arranged on an adjustable height plate 22 with a stand 23. The adjustable height permits an accurate correlation of the vibrator output channel with the connected processing station. The parts to be separated by the vibrator are fed into the vibrator from above through a feed channel. To minimize the radiation of sound in the area of the feed channel, a feed channel insulation 24 is provided around the feed channel, its length being determined essentially according to the same criteria as the length of the insulation on the conveyance channel described in conjunction with FIG. 1. The feed channel insulation projects upward from the upper insulation cover 25. Insulation elements 3 are arranged like a jacket beneath the upper insulation cover 25. Since two areas of the vibrator must be readily accessible through the soundproofing 1, two door-shaped insulation elements 26 are attached with hinges to the adjacent insulation element 3. The hinges are preferably each attached to the stable flat material. To be able to open and close the door-shaped insulation elements 26, closures 28 and optionally handles 29 are provided. In the case of the door-shaped insulation element 26 in the area of the vibrator outlet channel, visual monitoring through the closed insulation element 26 is desirable. Therefore, an inspection area 30 with two layers of plexiglass with a distance between them are provided in this insulation element 26.

Figure 3B:
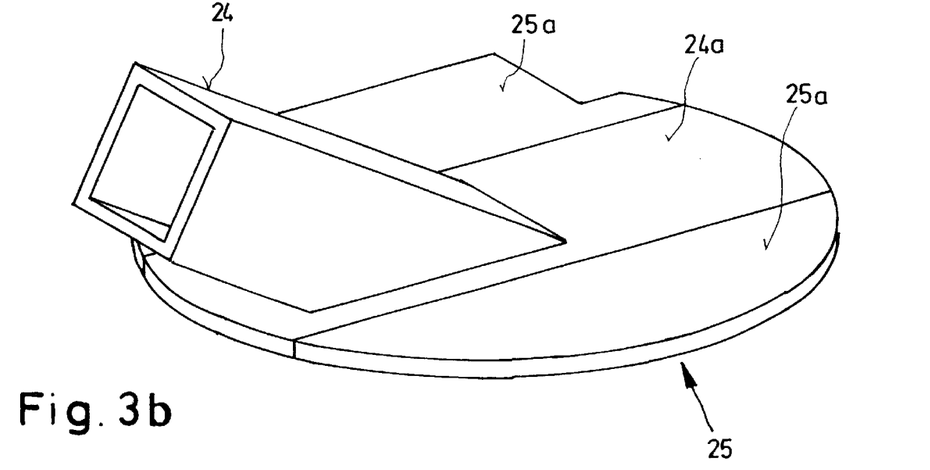
FIG. 3b: a perspective diagram of the cover insulation according to FIG. 3a, FIG. 3c: a perspective diagram of a mounting frame for insulation according to FIG. 3a, FIG. 4: a perspective diagram of a cyclone with soundproofing.

According to FIG. 3b, the upper insulation cover 25 is designed essentially in three parts. In the middle area, the feed channel insulation 24 is arranged with a planar cover area 24a and cover insulation elements 25a are arranged on both sides of it, optionally attached with hinges.

Figure 3C:
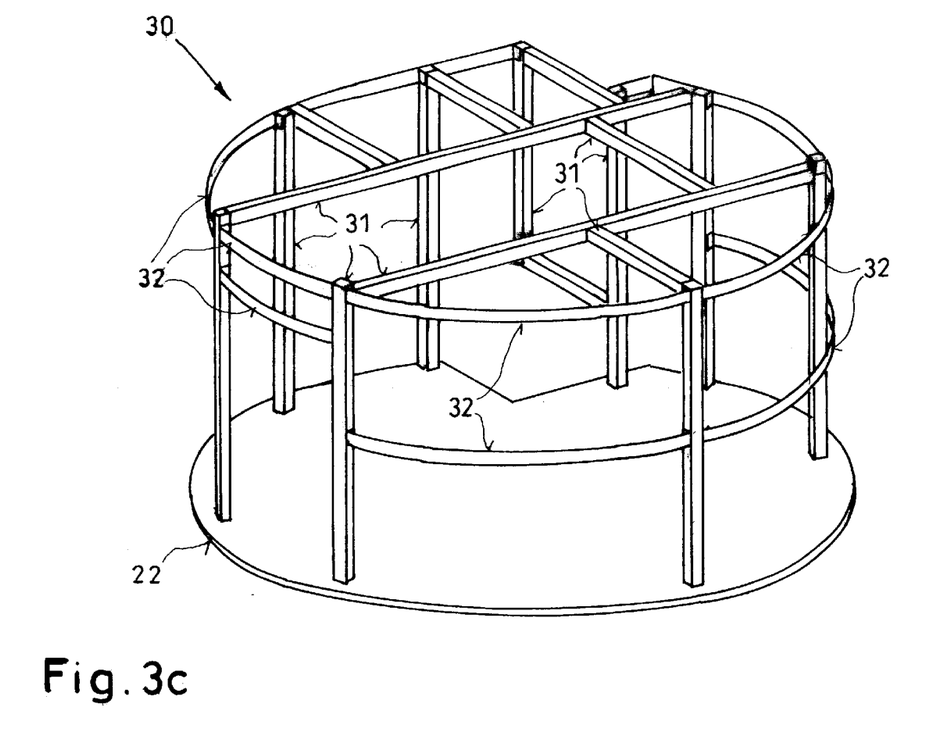

According to FIG. 3c, the insulation elements 3, 24 and 25 are held by a mounting frame 30, which permits soundproofing with a great stability. The mounting frame 30 comprises profile elements 31 and strip elements 32. The profile elements 31 are joined to form a framing which is attached to the plate 22. To minimize the transmission of structure-borne noise from the mounting frame 30 to the plate 22, the profile elements 31 attached to the plate 22 are connected to the plate 22 by elastic connecting elements and in particular with plastic screws. The strip elements 32 are attached to profile elements 31, making it possible to easily provide the desired curvatures. In mounting the insulation elements 3, 24 and 25, it is important to be sure that no unnecessarily strong sound bridges develop from the mounting frame 30 to the stable flat material of the insulation elements 3, 24 and 25. Therefore, the fastening is provided by elastic connecting elements which are screwed tightly between the mounting frame 30 and the stable flat material, preferably using plastic screws. The insulation elements 3, 24 and 25 are optionally tightened against the mounting frame 30 from the outside by tension bands. In the case of insulation elements which must be easily removable, velcro strips that work together may also be provided on the mounting frame 30 and on the insulation element 3 accordingly. To minimize the escape of sound through the plate 22, insulation elements 3 are preferably arranged on the plate 22, with the vibrator preferably standing on elastic supports which are arranged in recesses in these insulation elements.

Sound measurement were performed to determine the efficacy of the soundproofing system according to FIG. 3a. The equivalent sound pressure level was measured in the frequency range of 50 to 10,000 Hz for a vibrator 2 with and without soundproofing. The values measured in frequency bands show that this soundproofing permits a reduction in the equivalent sound pressure level by at least 10 dB(A) in the entire frequency range. The total sound pressure level over the frequency range without insulation was 96.3 dB(A) and with insulation it was 73.6 dB(A), which corresponds to a reduction by more than 20 dB(A). The sound pressure level achieved with the insulation is below the level of 75 dB(A) allowed for industrial and commercial activities for health reasons (Swiss SUVA standard). In the case of a continuous sound pressure level of 73.6 dB(A) achieved in this way, it is possible to hold a conversation at normal volume and no hearing protection is needed. Without this soundproofing, the use of hearing protection would be required.

Figures 4, 5, 6, 7:
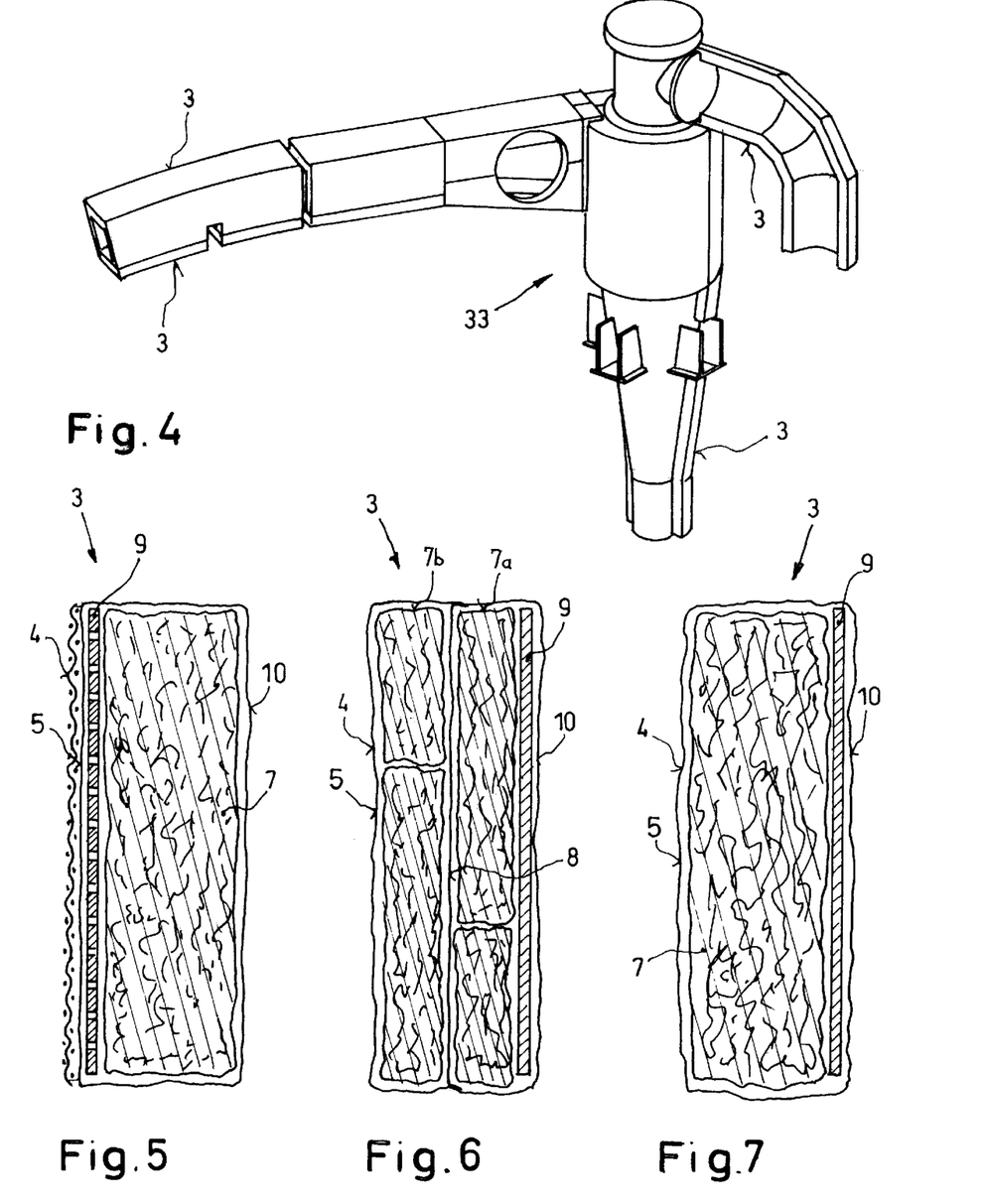

FIG. 4 shows a cyclone 33 which is used to separate particles from the process air of a wood processing installation, for example. It has been found that in the operating state, the cyclone 33 generates a great deal of noise because of the air flow created in it. The sound pressure level can be reduced significantly with soundproofing according to this invention for cyclone 33 together with the inlet and outlet lines. The insulation elements 3 are in direct contact with the outside surface of the cyclone 33 and the inlet and outlet lines. It has been found that it is simpler to fasten the insulation elements if the stable flat material is arranged in the area of the inner face and not in the area of the outer face. Because of the arrangement of the stable flat material in the area of the inner face, the heavy components of the soundproofing system are essentially in contact with the outside surfaces of the installation part carrying the insulation and only the light insulation material projects outward away from the installation part. In the arrangement of the stable flat material in the area of the outer face, at least the insulation material vertically above the installation part would be compressed by the stable flat material and thus would have less soundproofing effect. In addition, the stable flat material of adjacent insulation elements would not be located the same distance away from the outside surface of the installation part.

FIG. 5 illustrates an insulation element 3, where the stable flat material 9 is arranged in the area of the inner face. In order for the sound component which is to be absorbed in the insulation material 7 to be able to enter it, the stable flat material 9 is designed as a perforated plate. Sufficient sound insulation values are obtained with perforated plates in which the holes amount to approx. 30% of the total area and their hole diameter is in the range of 1 to 5 mm, preferably essentially 3 mm. In the case of a perforated plate in which the holes amount to 30%, therefore 70% of the surface area of the stable flat material is effective as a reflective surface. The effect of the sound absorbing membrane 4 is not altered noticeably by the nearby perforated plate. To keep the perforated plate at a slight distance from the sound absorbing membrane 4, it is optionally expedient to arrange a thin layer of insulation material between them. The insulation element 3 preferably includes at least one covering outer layer 10 in the area of the outer face and optionally a covering inner skin 5 between the insulation material 7 and the sound absorbing membrane 4. The sound absorbing membrane 4 is optionally formed by the covering inner skin 5 or attached to the covering inner skin 5. The material of the covering skins is preferably a fiberglass cloth, with the outer skin being coated with silicone, for example, and the inner skin preferably having wire, in particular V4A wire, interwoven with it. An especially suitable textile material for the covering inner skin and in particular for the sound absorbing membrane is a fiberglass-wire cloth known by the brand name Inconel, which has a weight of essentially 1.2 kg/m².

FIG. 6 shows an insulation element 3 in which the stable flat material 9 is arranged as a sheet with a thickness of essentially 2 mm in the area of the outer face, and where a covering interlayer 8 is arranged between two insulation material layers 7a and 7b with a thickness of 13 mm each. The parts of the insulation material layers 7a and 7b are preferably arranged with offset linings, so that a continuous gap can not extend from the covering inner skin 5 to the covering outer skin 10 or to the stable flat material 9. It is obvious that instead of or together with the covering interlayer 8, the stable flat material 9 may also be used in the form of a sheet metal or a perforated plate between the two insulation material layers 7a and 7b. In the case of especially high sound pressure levels, more than two insulation material layers and the interlayers between them may also be provided. In particular, in the case of a dominant spectral range, a resonator arrangement with an inner perforated plate and an outer reflective plate may also be produced through the correct choice of the distance between the metal sheets and the optimized hole design, so that the dominant spectral range is strongly damped.

FIG. 7 shows an insulation element 3, where the stable flat material 9 is designed as a plate with a thickness of essentially 1 mm arranged in the area of the outer face. Insulation element 3 comprises only one insulation material layer 7 with a thickness of 25 mm. The covering comprises a covering inner skin 5 consisting of a fiberglass cloth with wires woven into it and a covering outer skin 10 of fiberglass cloth coated with silicone. The sound absorbing membrane 4 is formed by the covering inner skin 5 and thus consists of fiberglass cloth with wires woven into it.

To determine empirically the soundproofing effect of individual components of the insulation elements, twelve different sample elements were produced. Each sample element was inserted into a door opening between two rooms to determine the sound reduction index according to ISO 140-3, 1995. A sound source is set up in the first room and a microphone is set up in the second room. The corresponding R value was determined in frequency bands with frequencies of 50, 63, 80, 100, 125, 160, 200, 250, 315, 400, 500, 630, 800, 1000, 1250, 1600, 2000, 2500, 3150, 4000 and 5000 Hz. The value thus determined is a measure of the difference in sound pressure level in the second room with the sample element inserted in comparison with that measured with the sample element omitted. A good soundproofing effect in a frequency range yields high R values in dB in the frequency bands of this frequency range. An insulation element which can be used in a variety of ways should thus have R values which are above a certain desired minimum level in all frequency bands. If the sound source that is to be attenuated emits mainly high or low frequency components, it is sufficient to use insulation elements that achieve a good sound absorbing effect in the high or low frequency range accordingly.

The parameters by which the samples differ pertain to the sound absorbing membrane, the covering and the stable flat material. Silicate fiber mats with a weight of 128 kg/m³ were always used as the insulation material. The total thickness of the insulation material was 25 mm. All the sample elements were rectangular with a length of 1.4 m and a width of 1 m. In the case of the covering, the covering inner skin was omitted or was used in the form of a fiberglass cloth with metal wires interwoven in it and a weight of essentially 1.2 kg/m². In the case of individual samples, the covering inner skin assumes the function of the sound absorbing membrane. The covering outer skin 10 was used in the form of a fiberglass cloth with a silicone coating or with metal wires. Samples in which the covering outer skin 10 was designed in the form of a wire cloth were also tested. To determine the effect of the sound absorbing membrane, samples in which the sound absorbing membrane was designed as a coarse or fine wire cloth or as fiberglass cloth with metal wires were also made available.

In the case of the coarse wire cloth, this is a cloth with 130 mesh/cm² and an open area of approx. 51%. The weight of this wire cloth is approx. 0.910 kg/m² with a wire diameter of approx. 0.25 mm. In the case of the fine wire cloth, it is a microfilter metal cloth. Microfilter metal cloth has a very high mesh count, optionally special weave structures and is produced from wires with a small cross section. Accordingly, a filter fineness of a few microns—e.g., 20 ηm—and a small air passage cross section or air permeability value can be achieved. The microfilter metal cloth used with a warp wire diameter of 0.042 mm and a weft wire diameter of 0.125 mm has a mesh count of 600×125 per cm².

This filter cloth has a weight of approx. 0.850 kg/m², which corresponds essentially to the weight of the coarse wire cloth. The stable flat material was used or omitted and was designed as a sheet metal or a perforated plate 1 mm or 2 mm thick.

Figure 8:
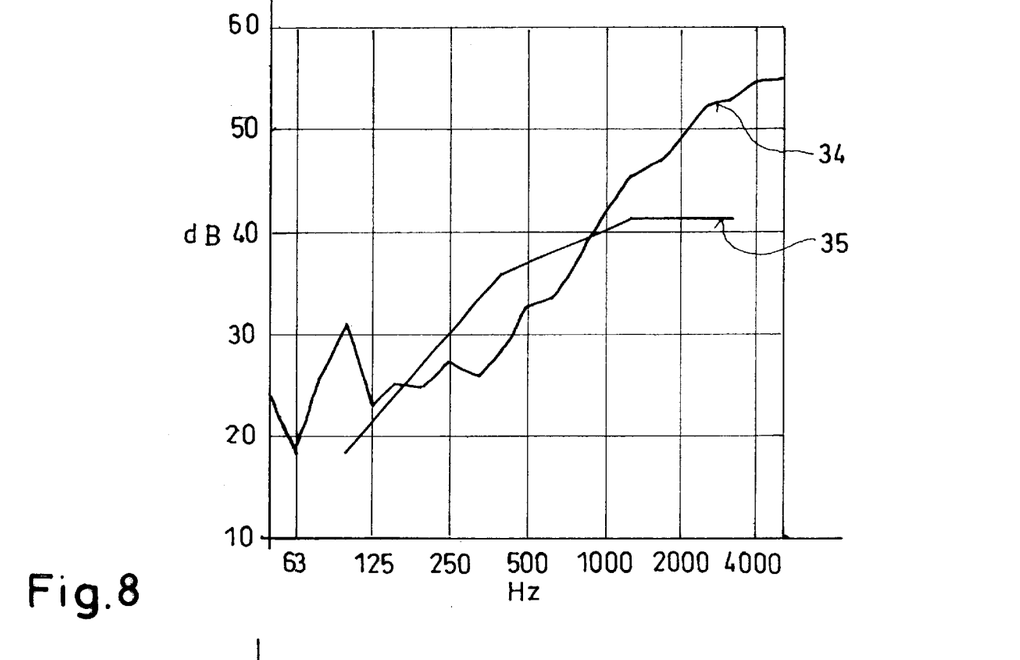
FIGS. 8 and 9: a measurement curves of the sound reduction index in dB according to ISO 140-3, 1995 for frequency bands in the range of 50 to 5000 Hz and a reference curve adapted to it according to ISO 717.

The results of the soundproofing measurements will now be explained on the basis of two measurement curves. FIG. 8 shows the sound reduction values of a sample with an especially good soundproofing effect. This sample corresponds essentially to the sample element according to FIG. 6, where a coarse wire cloth was also attached to the covering inner skin. On the basis of the analysis of all measurements, it can be assumed that the coarse wire cloth has only an insignificant effect on the soundproofing results. To characterize the measurement curve 34 with a value, the reference curve 35 was determined according to ISO 717 and its $R_w$ value at 500 Hz was found to be 37 dB. It is an advantage of the insulation elements according to this invention that an $R_w$ value of 37 dB can be achieved with an insulation element only 33 mm thick.

Figure 9:
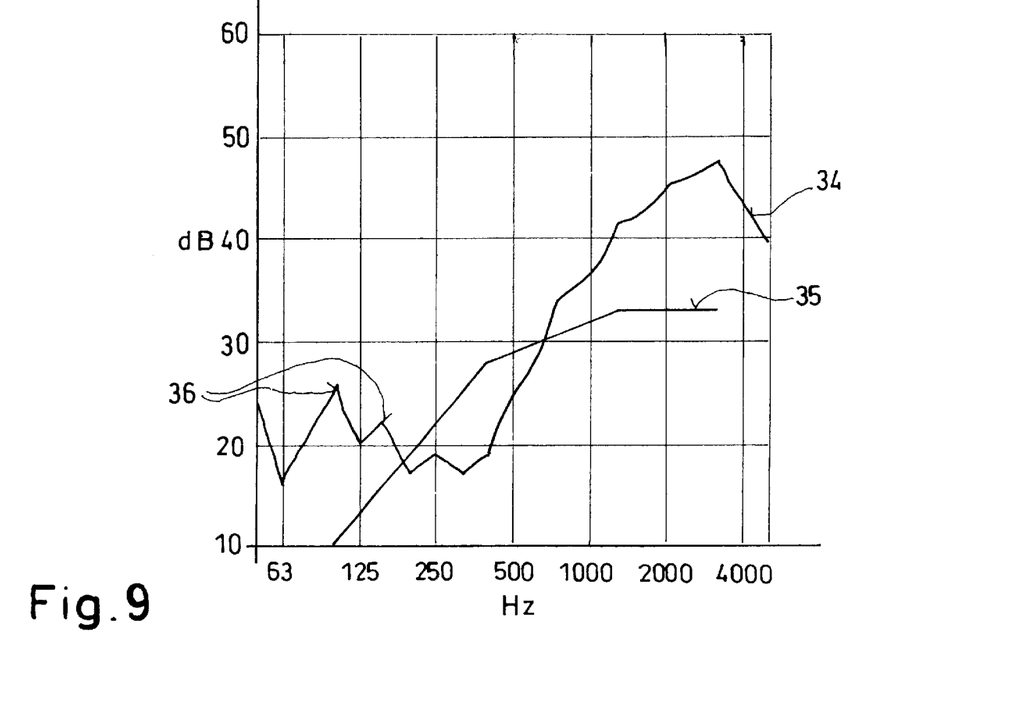

FIG. 9 shows the sound reduction values achieved with a sample element according to FIG. 7, with a coarse wire cloth also being attached to the covering inner skin, although it was irrelevant for the sound insulation value. The $R_w$ value is 29 dB. The increase in sound insulation values in the range of 500 to 1600 Hz originates essentially from the cushion arrangement with the insulation material 7 between the stable and airtight flat material 9 and the covering inner skin 5 or the sound absorbing membrane 4. The peaks 36 are in the range of the frequency bands 80 and 100 Hz and 160 Hz and are a sign of resonance. Since these peaks occur essentially with all sample elements, this could be resonance occurring because of the dimensions of the sample. For example, these might be natural vibrations of the sound absorbing membrane 4. In the frequency range of 200–400 Hz, the sound insulation values are low. It can be deduced from a comparison with FIG. 8 that the interlayer 8 of fiberglass cloth increases the sound insulation values in the range of 250–1000 Hz. The values in FIG. 9 are also lower than those in FIG. 8 because the sample according to FIG. 7 has a stable flat material with a thickness of only 1 mm and not 2 mm, as is the case with the sample according to FIG. 7.

A comparison of the measurement data on samples with and without the stable flat material shows that a sheet metal in the area of the outer face leads to an increase in the sound insulation values in the entire frequency range. This increase could be somewhat greater in the range of 125 to 500 Hz than outside this range. Good values are possible with sheet metal only 2 mm thick. In the case of sheet metal more than 6 mm thick, there is the risk that the sound insulation values will become worse again, so that the preferred thickness is thus in the range of 2 to 6 mm. The silicone coating of the covering outer skin seems to lead to a slight increase in sound insulation values in the frequency range of 250 to 2000 Hz. In the case of wire mesh, the fine cloth seems to yield an increase in sound insulation values in the range of only 1600 to 3000 Hz. No soundproofing effect of the coarse wire cloth could be detected explicitly with these measurements. However, since vibration of the coarse wire cloth is also induced with insulation according to FIG. 1, a soundproofing effect thereof could also be assumed. The insulation elements according to this invention show that the sound insulation value does not depend only on their mass but also essentially on their structure and the materials used. An appropriate design would include at least an airtight layer, which is preferably formed by the stable flat material. Optionally another airtight layer may also be provided with a covering skin coated with silicone.

Sound reduction measurements are performed by definition only on flat sample elements. However, the soundproofing system according to this invention is arranged around a sound generating device. The escape of sound from such a soundproofing system depends not only on the sound reduction effect of the insulation elements but also on the absorption of sound inside the soundproofing system. The absorption property of the sample elements was measured in an alpha cabinet, where it was found that there are essentially only two different characteristic frequency curves for the absorption coefficient. All the sample elements with a covering inner skin made of fiberglass cloth have absorption coefficients which become smaller from low frequencies to high frequencies and are large in the range below 500 Hz. All the sample elements without a covering inner skin made of fiberglass cloth, i.e., with only a wire cloth between the interior and the insulation material, have absorption coefficients that increase sharply from low frequencies around 500 Hz, are at their maximum between 500 and 2000 Hz, and in the range from 2000 to 5000 Hz they remain essentially at the value which also occurs at 500 Hz.

This is presumably due to the fact that the wire cloth does not significantly prevent sound from entering the insulation material for frequencies above 500 Hz, and absorption is very great in the long-fiber silicate fiber insulation material for frequencies above 500 Hz, because long air channels with a small cross section are formed in the insulation material in which the air movement due to sound is converted to turbulence. In the case of covering inner skins with fiberglass cloth, however, the sound component with frequencies above 500 Hz does not seem to be able to pass well through the fiberglass cloth into the insulation material, and the insulation material can absorb only a small portion of the sound accordingly. At frequencies below 500 Hz, the vibrating fiberglass cloth absorbs sound energy, which is apparent from the increase in absorption coefficient with a reduction in frequency. The fiberglass cloth that is used with the metal wire woven into it is not airtight, but instead has a sufficiently low air permeability. Despite the greater air permeability of the wire cloth, the absorption value at approx. 400 Hz of samples with only wire cloth as the inner face is only slightly below the corresponding values of samples with fiberglass cloth as the inner face. This means that the resonating wire cloth also absorbs sound in this frequency range.

This consideration, which is based on sound absorption, explains the sound reduction measurement on two sample elements, comprising only a covering of coarse and fine wire cloth with insulation material in it. These sample elements do not have a dense covering skin or a layer of flat material. In other words, the air channels in the insulation material are open toward both sides of the insulation element. In the absorption measurement, large values occur for frequencies of 500 to 5000 Hz. In the sound reduction measurement, however, the sound insulation values increase only slightly in the range of 500 to 5000 Hz and are definitely lower than the sound insulation values of the sample elements with at least one essentially airtight layer. In addition, with an increase in frequency, the sound insulation values of the sample with the fine wire cloth having the lower air permeability are increasingly higher than the corresponding sound insulation values of the sample with the coarse wire cloth.

The effect of the soundproofing systems according to this invention depends on the soundproofing effect of the insulation elements as well as the sound absorption in the interior of the soundproofing system, so insulation elements that guarantee high sound insulation value as well as good absorption coefficients for frequencies above 500 Hz are especially advantageous. These insulation elements should preferably have a covering interlayer with a high air permeability and an air-permeable covering inner skin 5, in particular made of wire cloth. The insulation material layer between the covering inner skin and the covering interlayer functions as the absorption layer, and the covering outer skin functions as the insulation layer. Such a sample element was produced with a covering of fine wire cloth and an interlayer of fiberglass cloth and with a steel plate 2 mm thick facing the outside. Sound insulation values measured on this sample correspond essentially to the values shown according to FIG. 8, with the values being 2 to 4 dB below the values in FIG. 8 in the range of 250 to 1000 Hz and 2 to 4 dB above the values in FIG. 8 in the range of 1250 to 5000 Hz.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A soundproofing system for insulating a sound generating device including a plurality of interconnectable insulating elements, wherein each interconnectable insulating element is extending from an inner face, upon assembly of the soundproofing system on the sound generating device, facing said sound generating device to an outer face, and includes:
    a layer of insulating material comprising fiber mat material;
    a covering made of textile material, including an inner skin on one side of the insulating layer proximate to said inner face and an outer skin on the other side of the insulating layer; and
    a stable flat material having a predetermined shape, being located between the outer skin and the inner skin of the covering and defining by its shape the shape of said interconnectable insulating element wherein, upon assembly of the soundproofing system on the sound generating device, coverings of neighboring interconnectable insulating elements are in contact to prevent rigid sound bridges.

2. A soundproofing system according to claim 1, wherein the textile material is one of a woven, knit or braided fabric, a net or a screen.

3. A soundproofing system according to claim 2, wherein the textile material is a fiberglass cloth.

4. The soundproofing system of claim 3, wherein the textile material includes a wire woven into it.

5. The soundproofing system of claim 2, wherein the textile material includes a wire woven into it.

6. A soundproofing system according to claim 2, wherein the textile material includes a wire cloth having a wire diameter in the range of 0.02 mm to 0.4 mm and a mesh count in the range of 80 to 1000 per cm in one direction.

7. A soundproofing system according to claim 1, wherein the textile material is a fiberglass cloth.

8. The soundproofing system of claim 7, wherein the textile material includes a wire woven into it.

9. A soundproofing system according to claim 7, wherein the textile material includes a wire cloth having a wire diameter in the range of 0.02 mm to 0.4 mm and a mesh count in the range of 80 to 1000 per cm in one direction.

10. A soundproofing system according to claim 1, wherein the textile material includes a wire cloth having a wire diameter in the range of 0.02 mm to 0.4 mm and a mesh count in the range of 80 to 1000 per cm in one direction.

11. The soundproofing system of claim 10, wherein the wire cloth is a microfilter cloth.

12. A soundproofing system according to claim 1, wherein the insulating material includes relatively long-fiber layer material and has cohesive air channel systems for absorption of sound in the relatively high frequency range.

13. The soundproofing system of claim 12, wherein the wire diameter of the microfilter cloth having a warp wire diameter of 0.042 mm and a weft wire diameter of 0.125 mm, a mesh count of 600×125 per $cm^2$ and a weight of approx. 850 $kg/m^2$.

14. The soundproofing system of claim 12, wherein the insulating material includes silicate fiber mats.

15. A soundproofing system according to claim 1, wherein the stable flat material includes at least one metal layer having a thickness of at least 1.5 mm.

16. The soundproofing system of claim 15, wherein the thickness of the metal layer is essentially 2 mm.

17. The soundproofing system of claim 15, wherein the thickness of the metal layer is less than 6 mm.

18. The soundproofing system of claim 15, wherein the stable material includes at least one layer of rubbery material.

19. A soundproofing system according to claim 1, wherein each insulating element includes an additional sound absorbing membrane proximate to the inner face.

20. The soundproofing system of claim 19, wherein the covering skin is attached to the insulating material.

21. A soundproofing system according to claim 19, wherein the insulating elements include at least one covering interlayer between the inner skin and the outer skin.

22. The soundproofing system of claim 21, wherein the interlayer is between two layers of insulating material.

23. A soundproofing system according to claim 21, wherein the insulating elements include first velcro strips attached to the covering outer skins and tabs with second velcro strips that fit with the former, thereby making adjacent insulating elements connectable by velcro fasteners which extend along contact areas between the insulating elements that are to be connected.

24. A soundproofing system according to claim 19, wherein the insulating elements include first velcro strips attached to the covering outer skins and tabs with second velcro strips that fit with the former, thereby making adjacent insulating elements connectable by velcro fasteners which extend along contact areas between the insulating elements that are to be connected.

25. A soundproofing system according to claim 1, wherein at least two insulating elements are combined to form a closed jacket, and the closed jacket is connected at its upper end face to at least one other insulating element.

* * * * *